United States Patent
LaRose, Jr. et al.

(10) Patent No.: US 8,561,393 B2
(45) Date of Patent: Oct. 22, 2013

(54) METHOD OF DETERMINING IF AN OXIDATION CATALYST IS QUENCHED OR IS NOT QUENCHED

(75) Inventors: Thomas LaRose, Jr., Redford, MI (US); David Michael VanBuren, Livonia, MI (US); Kari Jackson, Redford, MI (US); Patrick Barasa, Ann Arbor, MI (US); Michael V. Taylor, Wolverine Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 214 days.

(21) Appl. No.: 13/052,355

(22) Filed: Mar. 21, 2011

(65) Prior Publication Data

US 2012/0240553 A1    Sep. 27, 2012

(51) Int. Cl.
  *F01N 3/00* (2006.01)
(52) U.S. Cl.
  USPC .............. 60/286; 60/274; 60/295; 60/301; 60/303
(58) Field of Classification Search
  USPC ............ 60/274, 284, 286, 295, 297, 301, 303
  See application file for complete search history.

(56) References Cited

U.S. PATENT DOCUMENTS

| | | | |
|---|---|---|---|
| 3,882,451 A | 5/1975 | Fujishiro et al. | |
| 5,177,463 A * | 1/1993 | Bradshaw et al. | 340/438 |
| 6,131,388 A * | 10/2000 | Sasaki et al. | 60/286 |
| 6,240,723 B1 * | 6/2001 | Ito et al. | 60/278 |
| 6,508,057 B1 * | 1/2003 | Bouchez et al. | 60/286 |
| 6,594,990 B2 | 7/2003 | Kuenstler et al. | |
| 6,959,541 B2 | 11/2005 | Kosaka et al. | |
| 7,082,752 B2 | 8/2006 | Plote et al. | |
| 7,861,516 B2 * | 1/2011 | Allansson et al. | 60/286 |
| 8,011,177 B2 * | 9/2011 | Cheng | 60/286 |

FOREIGN PATENT DOCUMENTS

| | | |
|---|---|---|
| DE | 2346425 A | 4/1974 |
| DE | 10113010 A1 | 9/2002 |
| DE | 10325083 A1 | 1/2004 |
| DE | 602005000814 T2 | 1/2008 |
| EP | 1205647 A1 | 5/2002 |
| EP | 1669565 A1 | 6/2006 |

* cited by examiner

*Primary Examiner* — Binh Q Tran
(74) *Attorney, Agent, or Firm* — Quinn Law Group, PLLC

(57) ABSTRACT

A temperature of exhaust gas downstream of an oxidation catalyst is compared to a temperature of the exhaust gas upstream of the oxidation catalyst to determine if the downstream temperature is increasing over time or decreasing over time as hydrocarbons are injected into the flow of exhaust gas to regenerate a particulate filter. The oxidation catalyst is determined to be quenched when the temperature of the exhaust gas downstream of the oxidation catalyst remains constant or decreases over time as the rate at which the hydrocarbons are injected into the exhaust gas increases. The oxidation catalyst is determined to not be quenched when the temperature of the exhaust gas downstream of the oxidation catalyst increases over time as the rate at which the hydrocarbons are injected into the exhaust gas increases.

17 Claims, 2 Drawing Sheets

METHOD OF DETERMINING IF AN OXIDATION CATALYST IS QUENCHED OR IS NOT QUENCHED

TECHNICAL FIELD

The invention generally relates to a method of operating a vehicle, and more specifically to a method of determining if an oxidation catalyst of an exhaust gas treatment system of the vehicle is quenched or is not quenched.

BACKGROUND

Exhaust gas treatment systems for internal combustion engines, including but not limited to diesel engines, may include an oxidation catalyst, often referred to as a diesel oxidation catalyst when coupled to a diesel engine, for treating a flow of exhaust gas from the engine. The oxidation catalyst is a flow through device that consists of a canister containing a substrate or honeycomb-like structure. The substrate has a large surface area that is coated with an active catalyst layer. As the exhaust gases traverse the active catalyst layer, carbon monoxide, gaseous hydrocarbons and liquid hydrocarbon particles, i.e., unburned fuel and/or oil, are oxidized, thereby reducing harmful emissions.

However, in order for the active catalyst layer to oxidize the carbon monoxide, gaseous hydrocarbons and liquid hydrocarbon particles, the active catalyst layer must be at or above a light-off temperature. Often, once the active catalyst layer reaches the light-off temperature, additional hydrocarbons are injected into the flow of exhaust gas through either late post fuel injection or a hydrocarbon injector. The additional hydrocarbons injected into the flow of exhaust gas may be ignited to further heat the flow of exhaust gas. The injection rate of the hydrocarbons may be increased at an acceleration rate, i.e., ramped up over time. The hydrocarbon injection rate is ramped up, i.e., accelerated, as quickly as the system allows to minimize regeneration time.

The performance of the oxidation catalyst degrades over time with usage of the vehicle due to the loss of the active catalyst material and/or sintering caused by high exhaust gas temperatures. This degradation may cause an increase in the light-off temperature, which may lead to quenching of the oxidation catalyst. Quenching of the oxidation catalyst is defined as the cessation of hydrocarbon oxidation that occurs when the temperature of the active catalyst layer decreases below the light-off temperature. Quenching of the oxidation catalyst may cause excessive hydrocarbons to slip past the oxidation catalyst, thereby reducing the performance of the exhaust gas treatment system, or may result in collection of hydrocarbons on the substrate of the oxidation catalyst, which may lead to excessive temperatures once the light-off temperature is reached and the collected hydrocarbons begin to oxidize.

SUMMARY

A method of determining if an oxidation catalyst of an exhaust gas treatment system is quenched or is not quenched is provided. The method includes injecting hydrocarbons at an injection rate into a flow of exhaust gas upstream of the oxidation catalyst when the temperature of the oxidation catalyst is equal to or greater than a light-off temperature of the oxidation catalyst. The injection rate is increased at an acceleration rate. An upstream temperature of the exhaust gas is sensed upstream of the oxidation catalyst, and a downstream temperature of the exhaust gas is sensed downstream of the oxidation catalyst. The method further includes determining if the oxidation catalyst is quenched or is not quenched. The oxidation catalyst is determined to be not quenched when the sensed downstream temperature of the exhaust gas is greater than the sensed upstream temperature of the exhaust gas as the hydrocarbon injection rate increases. The oxidation catalyst is determined to be quenched when the sensed downstream temperature of the exhaust gas is equal to or less than the upstream temperature of the exhaust gas as the hydrocarbon injection rate increases.

A method of operating a vehicle is also provided. The method includes detecting a request to regenerate a particulate filter, and injecting hydrocarbons at an injection rate into a flow of exhaust gas upstream of an oxidation catalyst when the temperature of the oxidation catalyst is equal to or greater than a light-off temperature of the oxidation catalyst. The injection rate is increased at an acceleration rate. An upstream temperature of the exhaust gas is sensed upstream of the oxidation catalyst, and a downstream temperature of the exhaust gas is sensed downstream of the oxidation catalyst. The method further includes determining if the oxidation catalyst is quenched or is not quenched. The oxidation catalyst is determined to be not quenched when the sensed downstream temperature of the exhaust gas increases over time as the hydrocarbon injection rate increases. The oxidation catalyst is determined to be quenched when the sensed downstream temperature of the exhaust gas decreases as the hydrocarbon injection rate increases, or when the sensed downstream temperature of the exhaust gas remains unchanged relative to the sensed upstream temperature as the hydrocarbon injection rate increases. The method further includes comparing a temperature downstream of the particulate filter of the exhaust gas treatment system to a temperature upstream of the particulate filter to determine if an exothermic temperature of the particulate filter is increasing over time, and a number of tracked occurrences in which the oxidation catalyst is determined to be quenched is compared to a pre-defined limit to determine if the number of tracked occurrences is less than, equal to or greater than the pre-defined limit. The method further includes signaling when the oxidation catalyst is determined to be quenched, the exothermic temperature of the particulate filter increases over time, and the number of tracked occurrences is equal to or greater than the pre-defined limit.

The above features and advantages and other features and advantages of the present invention are readily apparent from the following detailed description of the best modes for carrying out the invention when taken in connection with the accompanying drawings.

DETAILED DESCRIPTION

A method of operating a vehicle includes controlling an exhaust gas treatment system 20 for treating exhaust gas, generally indicated by arrow 22, from an engine 24 of the vehicle 26. The engine 24 may include but is not limited to a diesel engine. The method may be embodied as one or more algorithms operable on one or more controllers of the vehicle 26.

Figure 1:
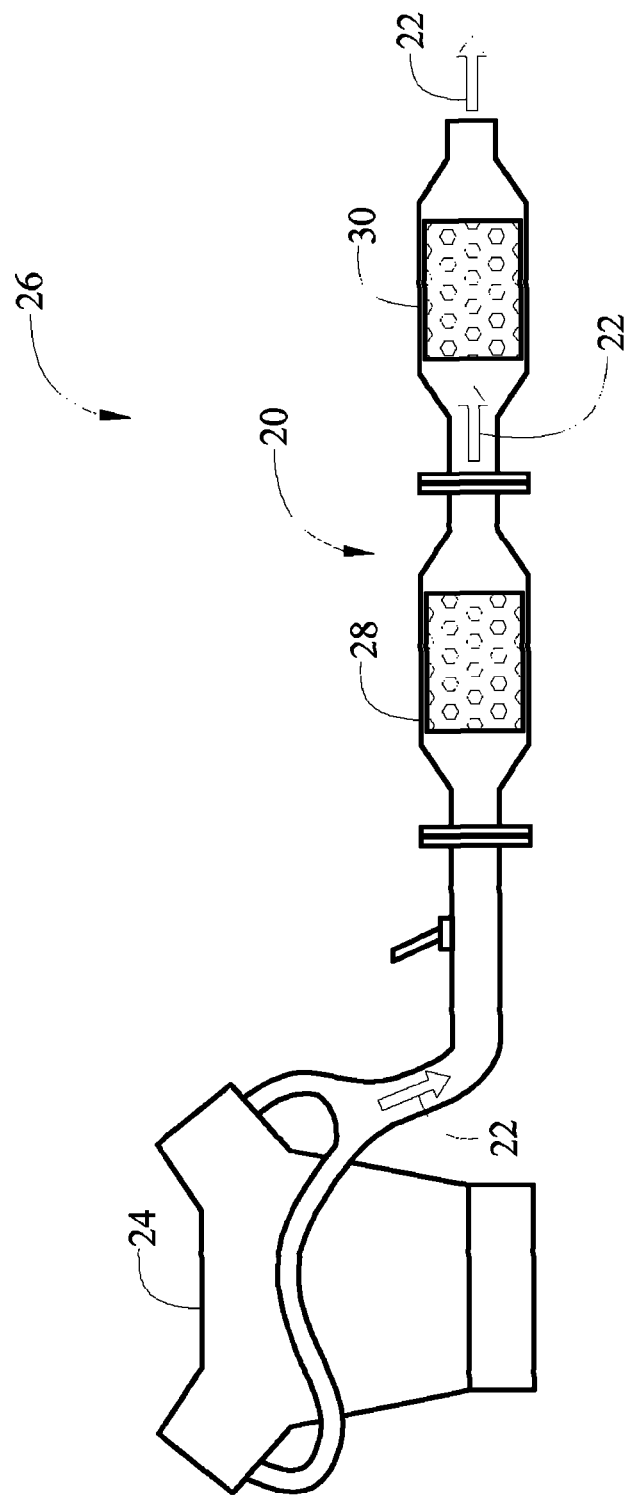
FIG. 1 is a schematic plan view of a vehicle showing an engine and an exhaust gas treatment system for treating exhaust gas from the engine.

Referring to FIG. 1, the exhaust gas treatment system 20 includes an oxidation catalyst 28. If the engine 24 includes a diesel engine 24, then the oxidation catalyst 28 may be referred to as a diesel oxidation catalyst 28. The oxidation catalyst 28 is a flow through device that consists of a canister containing a substrate or honeycomb-like structure. The substrate has a large surface area that is coated with an active catalyst layer. The oxidation catalyst 28 treats the flow of exhaust gas from the diesel engine 24 to reduce the toxicity of the exhaust gas, i.e., to reduce toxic emissions of the exhaust gas, including but not limited to, nitrogen oxides (NO), carbon monoxide (CO) and/or hydrocarbons (HC). As the exhaust gases traverse the active catalyst layer, carbon monoxide, gaseous hydrocarbons and liquid hydrocarbon particles, i.e., unburned fuel and/or oil, are oxidized, thereby reducing harmful emissions. The active catalyst material may include Platinum Group Metals (PGM), and convert a percentage of the nitrogen oxides in the exhaust gas into nitrogen and carbon dioxide or water, as well as oxidizes a percentage of the carbon monoxide to carbon dioxide and oxidizes a percentage of the unburnt hydrocarbons to carbon dioxide and water.

The active catalyst layer must be heated to a light-off temperature of the catalyst before the active catalyst layer becomes operational and oxidizes the nitrogen oxides, the carbon monoxide and the unburnt hydrocarbons. Accordingly, the exhaust gas must heat the active catalyst layer to the light-off temperature before the reaction between the active catalyst layer and the exhaust gas begins. In order to rapidly heat the oxidation catalyst 28 and/or other components of the exhaust gas treatment system 20, including but not limited to a particulate filter 30 disposed downstream of the oxidation catalyst 28, hydrocarbons may be injected into the flow of exhaust gas. The hydrocarbons are ignited to generate heat within the exhaust gas, which is transferred to the oxidation catalyst 28 and/or the other components of the exhaust gas treatment system 20. The hydrocarbons may be injected through a late post injection process or through a hydrocarbon injector. The hydrocarbons are injected after the oxidation catalyst 28 has reached a burn threshold temperature, which is greater than the light-off temperature, to ensure that the injected hydrocarbons are oxidized across the active catalyst layer.

The performance of the oxidation catalyst 28 degrades or lessens with usage due to loss of catalyst material from the active catalyst layer, and also due to sintering of the substrate. As the oxidation catalyst 28 degrades with usage, the light-off temperature of the oxidation catalyst 28 increases. If the light-off temperature of the oxidation catalyst 28 increases to a temperature above the burn threshold temperature, the hydrocarbons would slip through the oxidation catalyst 28 and/or become trapped on the substrate of the oxidation catalyst 28 or other components of the exhaust gas treatment system 20 without oxidizing. Furthermore, the reduced performance of the oxidation catalyst 28 may lead to the quenching of the oxidation catalyst 28. As used herein, the term quenching is defined as the cessation of hydrocarbon oxidation across the oxidation catalyst 28.

Figure 2:
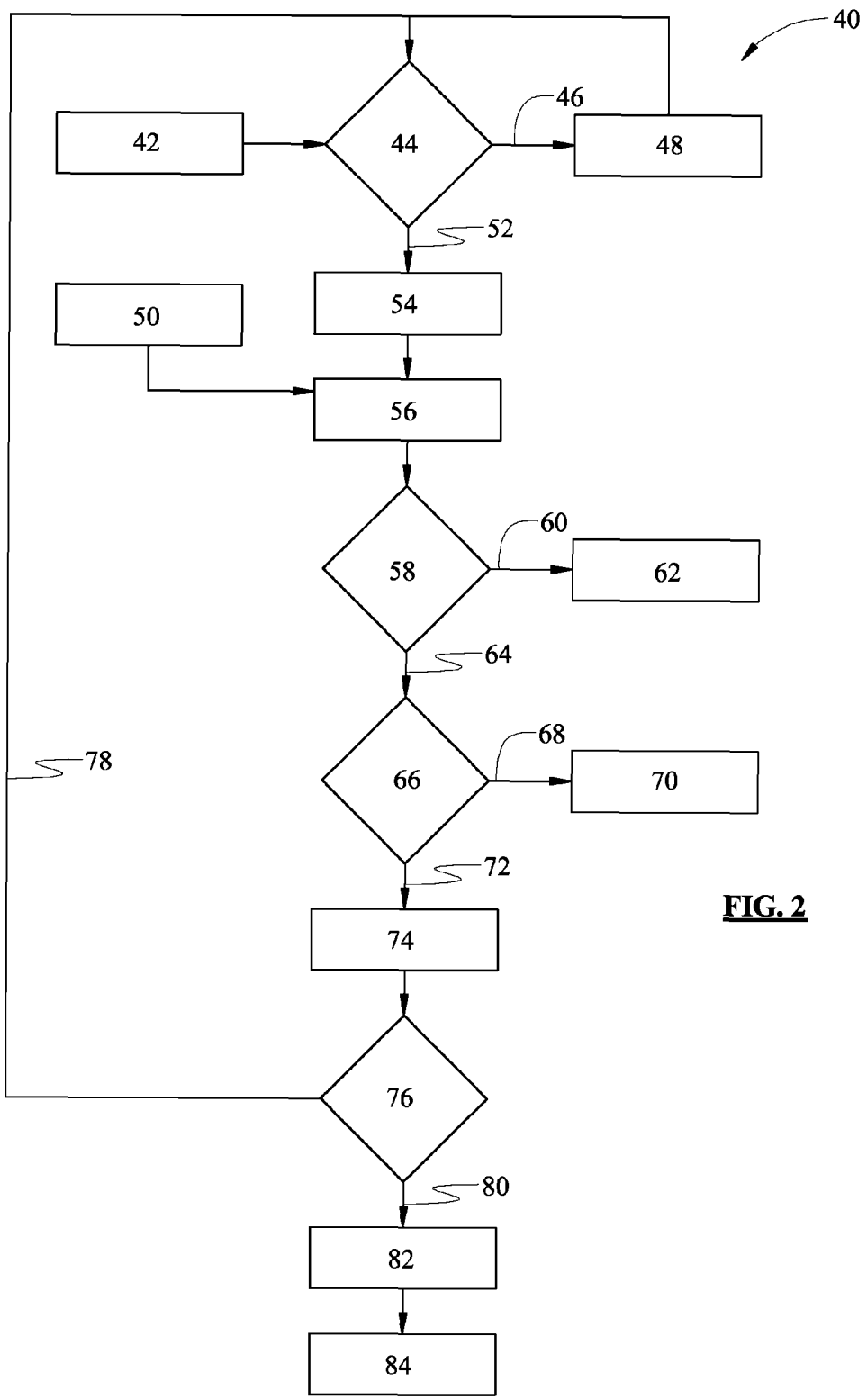
FIG. 2 is a schematic flow chart showing a method of operating the vehicle.

In order to take remedial action when the oxidation catalyst 28 is quenched, the vehicle 26 must first identify or determine if the oxidation catalyst 28 is or is not quenched. Accordingly, a method of determining if the oxidation catalyst 28 of the exhaust gas treatment system 20 is quenched or is not quenched is described herein. Referring to FIG. 2, the method is generally shown at 40. The method includes detecting a request to regenerate the particulate filter 30, generally indicated by box 42. As is known, the particulate filter 30 must be regenerated periodically to burn off accumulated particulate matter trapped therein. Once the request to regenerate the particulate filter 30 is received, the vehicle 26 determines if the temperature of the active catalyst layer is less than, equal to or greater than the light-off temperature, generally indicated by box 44. If the temperature of the active catalyst layer is below the light-off temperature, generally indicated at 46, then the vehicle 26 controller delays regeneration, generally indicated by box 48, until the temperature of the active catalyst layer is equal to or greater than the light-off temperature so that the active catalyst layer may react with injected hydrocarbons to regenerate the oxidation catalyst 28. The temperature of the active catalyst layer may be determined in any suitable manner, including but not limited to a temperature sensor configured for sensing the temperature of the active catalyst layer, or by relating the temperature of the active catalyst layer from the upstream and downstream temperatures of the exhaust gas.

The method further includes defining an acceleration rate of hydrocarbon injection, generally indicated by box 50. The acceleration rate of hydrocarbon injection may include a linear acceleration rate, or a non-linear acceleration rate. In order to regenerate the particulate filter 30, hydrocarbons are injected into the flow of exhaust gas and react with the active catalyst layer in the oxidation catalyst 28. The hydrocarbons are initially injected into the exhaust gas at an initial hydrocarbon injection rate. The initial hydrocarbon injection rate is a measure of the quantity of hydrocarbons injected over a given time. The initial hydrocarbon injection rate is increased over time. Accordingly, the initial hydrocarbon injection rate is accelerated or ramped up over time. The acceleration rate determines how quickly the injection rate changes over time. The acceleration rate is initially set to a rate that increases the injection rate as aggressively and/or as quickly as the oxidation catalyst 28 allows when operating at one hundred percent (100%) efficiency to complete the regeneration of the oxidation catalyst 28 as quickly as possible.

Once the active catalyst layer is at or above the light-off temperature, generally indicated at 52, the method includes injecting hydrocarbons, generally indicated by box 54, at the injection rate into the flow of exhaust gas upstream of an oxidation catalyst 28 to heat the oxidation catalyst 28. The injection rate of the hydrocarbons is then increased at the acceleration rate as described above, generally indicated by box 56.

The method further includes sensing a status of the oxidation catalyst 28 to determine if the oxidation catalyst 28 is quenched or is not quenched, generally indicated by box 58. As used herein, the oxidation catalyst 28 is quenched when the temperature of the exhaust gas downstream of the oxidation catalyst 28 is equal to or less than the temperature of the exhaust gas upstream of the oxidation catalyst 28 as the hydrocarbon injection rate increases. More specifically, the oxidation catalyst 28 is quenched when the sensed downstream temperature of the exhaust gas decreases over time as the hydrocarbon injection rate increases, or when the sensed downstream temperature of the exhaust gas remains unchanged over time relative to the sensed upstream temperature as the hydrocarbon injection rate increases. The temperature of the exhaust gas should increase with the increased injection rate of hydrocarbons because the quantity of hydrocarbons in the exhaust gas is continuously increasing. If the temperature of the exhaust gas downstream of the oxidation catalyst 28 is not increasing over time with increased injection of hydrocarbons, i.e., the downstream temperature remains constant or is decreasing, then the increased quantity of hydrocarbons is failing to react with the active catalyst layer, and the oxidation catalyst 28 is quenched.

The oxidation catalyst 28 is not quenched when the sensed downstream temperature of the exhaust gas is greater than the sensed upstream temperature of the exhaust gas as the hydrocarbon injection rate increases. More specifically, when the temperature of the exhaust gas downstream of the oxidation catalyst 28 is increasing over time relative to the temperature of the exhaust gas upstream of the oxidation catalyst 28, the injection rate of the hydrocarbons increases. The increasing relative temperature indicates that the increasing quantity of hydrocarbons is reacting with the active catalyst layer in the oxidation catalyst 28, and the oxidation catalyst 28 is not quenched.

Accordingly, sensing the status of the oxidation catalyst 28 includes sensing an upstream temperature of the exhaust gas upstream of the oxidation catalyst 28, and sensing a downstream temperature of the exhaust gas downstream of the oxidation catalyst 28. The sensed downstream temperature of the exhaust gas is compared with the sensed upstream temperature of the exhaust gas as the hydrocarbon injection rate increases to determine if the sensed downstream temperature is less than, equal to or greater than the upstream temperature as the hydrocarbon injection rate increases. It is determined that the oxidation catalyst 28 is not quenched, generally indicated at 60, when the downstream temperature of the exhaust gas is greater than the upstream temperature of the exhaust gas as the hydrocarbon injection rate increases, i.e., when the sensed downstream temperature of the exhaust gas increases over time in conjunction with an increase in the hydrocarbon injection rate. If the oxidation catalyst 28 is not quenched, then no action is taken, generally indicated by box 62. It is determined that the oxidation catalyst 28 is quenched, generally indicated at 64, when the downstream temperature of the exhaust gas is equal to or less than the upstream temperature of the exhaust gas as the hydrocarbon injection rate increases, i.e., when the sensed downstream temperature of the exhaust gas decreases over time in conjunction with an increase in the hydrocarbon injection rate, or remains unchanged over time relative to the sensed upstream temperature as the hydrocarbon injection rate increases.

As the particulate filter 30 is disposed downstream of the oxidation catalyst 28, any hydrocarbons that slip past the oxidation catalyst 28 when the oxidation catalyst 28 is quenched may accumulate on the particulate filter 30. Upon the particulate filter 30 reaching the light-off temperature, the accumulated hydrocarbons burn, thereby providing an exothermic temperature increase. As such, a measured increase in the exothermic temperature of the particulate filter 30 indicates the excess hydrocarbons are slipping past the oxidation catalyst 28, which indicates that the oxidation catalyst 28 is quenched. Accordingly, the method further includes sensing a temperature of the particulate filter 30 to determine if an exothermic temperature of the particulate filter 30 is increasing, generally indicated by box 66. Sensing the temperature of the particulate filter 30 may include sensing a temperature of exhaust gas upstream of the particulate filter 30 and sensing a temperature of exhaust gas downstream of the particulate filter 30. The sensed temperature downstream of the particulate filter 30 is compared to the sensed temperature upstream of the particulate filter 30 to determine if the exothermic temperature of the particulate filter 30 is increasing. If the sensed temperature of the particulate filter 30 is determined to be steady, i.e., not increasing, generally indicated at 68, then no action is taken, generally indicated by box 70.

If the sensed temperature of the particulate filter 30 is determined to be increasing, generally indicated at 72, then the method may further include tracking a number of occurrences in which the status of the oxidation catalyst 28 is determined to be quenched, generally indicated by box 74. The number of tracked occurrences may be stored in memory of the controller. The number of tracked occurrences in which the status of the oxidation catalyst 28 is determined to be quenched may then be compared to a pre-defined limit to determine if the number of tracked occurrences is less than or equal to the pre-defined limit, generally indicated by box 76. The pre-defined limit represents the number of instances in which the vehicle 26 may attempt to regenerate the particulate filter 30 before determining that the oxidation catalyst 28 is quenched. If the number of occurrences is less than the pre-defined limit, generally indicated at 78, then the vehicle 26 controller may retry regeneration of the particulate filter 30. If the number of occurrences is equal to or greater than the pre-defined limit, generally indicated at 80, then the oxidation catalyst 28 may be degraded and may no longer be operating at one hundred percent (100%) efficiency, and the controller may make the determination that the oxidation catalyst 28 is in fact quenched, generally indicated by box 82. The controller may further require that the exothermic temperature of the particulate filter 30 increase over time, and the number of tracked occurrences is equal to or greater than the pre-defined limit before making the determination that the oxidation catalyst 28 is quenched.

The method further includes signaling when the oxidation catalyst 28 is determined to be quenched, generally indicated by box 84. The controller may signal that the oxidation catalyst 28 is quenched in any suitable manner, including but not limited to setting a flag in a control algorithm equal to a value that indicates that the oxidation catalyst 28 is quenched. Once the controller has signaled that the oxidation catalyst 28 is quenched, then remedial action may be taken to prevent further quenching of the oxidation catalyst 28, or determine if the oxidation catalyst 28 must be replaced.

While the best modes for carrying out the invention have been described in detail, those familiar with the art to which this invention relates will recognize various alternative designs and embodiments for practicing the invention within the scope of the appended claims.

The invention claimed is:

1. A method of determining if an oxidation catalyst of an exhaust gas treatment system is quenched or is not quenched, the method comprising:

injecting hydrocarbons at an injection rate into a flow of exhaust gas upstream of the oxidation catalyst when the temperature of the oxidation catalyst is equal to or greater than a light-off temperature of the oxidation catalyst;

increasing the injection rate at an acceleration rate;

sensing an upstream temperature of the exhaust gas upstream of the oxidation catalyst;

sensing a downstream temperature of the exhaust gas downstream of the oxidation catalyst;

determining that the oxidation catalyst is not quenched when the sensed downstream temperature of the exhaust gas is greater than the sensed upstream temperature of the exhaust gas as the hydrocarbon injection rate increases, and when the sensed downstream temperature of the exhaust gas increases over time as the hydrocarbon injection rate increases; and determining that the oxidation catalyst is quenched when the sensed downstream temperature of the exhaust gas is equal to or less than the upstream temperature of the exhaust gas as the hydrocarbon injection rate increases.

2. A method as set forth in claim 1 wherein determining the oxidation catalyst is quenched when the sensed downstream temperature of the exhaust gas is equal to or less than the upstream temperature of the exhaust gas as the hydrocarbon injection rate increases is further defined as determining the oxidation catalyst is quenched when the sensed downstream temperature of the exhaust gas decreases as the hydrocarbon injection rate increases.

3. A method as set forth in claim 1 wherein determining the oxidation catalyst is quenched when the sensed downstream temperature of the exhaust gas is equal to or less than the upstream temperature of the exhaust gas as the hydrocarbon injection rate increases is further defined as determining the oxidation catalyst is quenched when the sensed downstream temperature of the exhaust gas remains unchanged relative to the sensed upstream temperature as the hydrocarbon injection rate increases.

4. A method as set forth in claim 1 further comprising sensing a temperature of a particulate filter of the exhaust gas treatment system to determine if an exothermic temperature of the particulate filter is increasing.

5. A method as set forth in claim 4 wherein sensing the temperature of the particulate filter includes sensing a temperature of exhaust gas upstream of the particulate filter and sensing a temperature of exhaust gas downstream of the particulate filter.

6. A method as set forth in claim 5 further comprising comparing the sensed temperature downstream of the particulate filter to the sensed temperature upstream of the particulate filter to determine if the exothermic temperature of the particulate filter is increasing.

7. A method as set forth in claim 6 further comprising tracking a number of occurrences in which the oxidation catalyst is determined to be quenched.

8. A method as set forth in claim 7 further comprising comparing the number of tracked occurrences in which the oxidation catalyst is determined to be quenched to a pre-defined limit to determine if the number of tracked occurrences is less than, equal to or greater than the pre-defined limit.

9. A method as set forth in claim 8 further comprising signaling when the oxidation catalyst is determined to be quenched, the exothermic temperature of the particulate filter increases over time, and the number of tracked occurrences is equal to or greater than the pre-defined limit.

10. A method as set forth in claim 1 further comprising sensing a temperature of the oxidation catalyst to determine if the temperature of the oxidation catalyst is less than, equal to or greater than the light-off temperature of the oxidation catalyst.

11. A method as set forth in claim 1 further comprising comparing the sensed downstream temperature of the exhaust gas with the sensed upstream temperature of the exhaust gas as the hydrocarbon injection rate increases to determine if the sensed downstream temperature is less than, equal to or greater than the sensed upstream temperature as the hydrocarbon injection rate increases.

12. A method as set forth in claim 1 further comprising detecting a request to regenerate a particulate filter.

13. A method as set forth in claim 1 wherein the acceleration rate includes one of a linear acceleration rate or a non-linear acceleration rate.

14. A method of operating a vehicle, the method comprising:
    detecting a request to regenerate a particulate filter;
    injecting hydrocarbons at an injection rate into a flow of exhaust gas upstream of an oxidation catalyst when the temperature of the oxidation catalyst is equal to or greater than a light-off temperature of the oxidation catalyst;
    increasing the injection rate at an acceleration rate;
    sensing an upstream temperature of the exhaust gas upstream of the oxidation catalyst;
    sensing a downstream temperature of the exhaust gas downstream of the oxidation catalyst;
    determining that the oxidation catalyst is not quenched when the sensed downstream temperature of the exhaust gas increases over time as the hydrocarbon injection rate increases;
    determining that the oxidation catalyst is quenched when the sensed downstream temperature of the exhaust gas decreases as the hydrocarbon injection rate increases, or when the sensed downstream temperature of the exhaust gas remains unchanged relative to the sensed upstream temperature as the hydrocarbon injection rate increases;
    comparing a temperature downstream of a particulate filter of the exhaust gas treatment system to a temperature upstream of the particulate filter to determine if an exothermic temperature of the particulate filter is increasing over time;
    comparing a number of tracked occurrences in which the oxidation catalyst is determined to be quenched to a pre-defined limit to determine if the number of tracked occurrences is less than, equal to or greater than the pre-defined limit; and
    signaling when the oxidation catalyst is determined to be quenched, the exothermic temperature of the particulate filter increases over time, and the number of tracked occurrences is equal to or greater than the pre-defined limit.

15. A method as set forth in claim 14 further comprising sensing a temperature of exhaust gas upstream of the particulate filter and sensing a temperature of the exhaust gas downstream of the particulate filter to determine if the exothermic temperature of the particulate filter is increasing.

16. A method as set forth in claim 15 further comprising tracking a number of occurrences in which the oxidation catalyst is determined to be quenched.

17. A method as set forth in claim 16 further comprising sensing a temperature of the oxidation catalyst to determine if the temperature of the oxidation catalyst is less than, equal to or greater than the light-off temperature of the oxidation catalyst.

* * * * *